US007910189B2

(12) United States Patent
Kassal et al.

(10) Patent No.: US 7,910,189 B2
(45) Date of Patent: Mar. 22, 2011

(54) PHOTO SHEET ASSEMBLY WITH REMOVABLE ADHESIVE PORTIONS

(75) Inventors: John Kassal, Woodstock, IL (US); Ron Kassal, South Beloit, IL (US); Todd Davis, Marengo, IL (US)

(73) Assignee: Continental Datalabel, Inc., Elgin, IL (US)

( * ) Notice: Subject to any disclaimer, the term of this patent is extended or adjusted under 35 U.S.C. 154(b) by 743 days.

(21) Appl. No.: 11/820,731

(22) Filed: Jun. 20, 2007

(65) Prior Publication Data

US 2008/0053589 A1 Mar. 6, 2008

Related U.S. Application Data

(60) Provisional application No. 60/815,046, filed on Jun. 20, 2006.

(51) Int. Cl.
*B32B 9/00* (2006.01)
*B32B 33/00* (2006.01)

(52) U.S. Cl. ..................... 428/40.1; 428/42.1; 428/42.2; 428/42.3

(58) Field of Classification Search ................. 428/40.1, 428/42.1, 42.2, 42.3
See application file for complete search history.

(56) References Cited

U.S. PATENT DOCUMENTS 3,335,514 A * 8/1967 Blackman ....................... 40/772
6,220,504 B1 4/2001 Flynn et al.
6,279,817 B1 8/2001 Flynn et al.
6,415,976 B1 7/2002 Flynn et al.

* cited by examiner

*Primary Examiner* — Victor S Chang
(74) *Attorney, Agent, or Firm* — Pauley Petersen & Brickson

(57) ABSTRACT

A sheet assembly that includes a first facing sheet, a second facing sheet, and an adhesive material disposed between the first and second facing sheets. A plurality of shapes is cut within a remaining portion of the first facing sheet, and each of the plurality of shapes defines a removable portion disposed over a portion of the second facing sheet. Upon removal of the removable portion the adhesive material is exposed and a photograph or other item can be adhered to the sheet assembly. The remaining portion of the sheet assembly includes a printable area for writing notes or comments about the adhered photo.

20 Claims, 5 Drawing Sheets

PHOTO SHEET ASSEMBLY WITH REMOVABLE ADHESIVE PORTIONS

CROSS REFERENCE TO RELATED APPLICATION

This application claims the benefit of U.S. Provisional Patent Application Ser. No. 60/815,046, filed on 20 Jun. 2006. The co-pending Provisional Patent Application is hereby incorporated by reference herein in its entirety and is made a part hereof, including but not limited to those portions which specifically appear hereinafter.

BACKGROUND OF THE INVENTION

This invention is directed to a sheet having removable portions to expose adhesive to which, for example, photos can be adhered.

SUMMARY OF THE INVENTION

A general object of the invention is to provide a sheet to which photos or other items can be adhered and described, such as for use in, for example, scrap-booking or other record keeping.

The general object of the invention can be attained, at least in part, through a sheet assembly that includes a first facing sheet, a second facing sheet, and an adhesive material disposed between the first and second facing sheets. A plurality of shapes is cut within a remaining portion of the first facing sheet, and each of the plurality of shapes defines a removable portion disposed over a portion of the second facing sheet. Upon removal of the removable portion the adhesive material is exposed. The remaining portion includes a printable area.

The invention further comprehends a method of using the sheet assembly of the invention. The method includes removing the removable portion defined by one of the plurality of shapes to expose the adhesive material and placing a picture on the exposed adhesive material. The user can write or print (e.g., using a computer printer) on the printable area, which is desirably aligned with the picture, to associate a note or record with the picture.

The invention further comprehends a sheet assembly including a first facing sheet, a second facing sheet, and an adhesive material disposed between the first and second facing sheets. Each of the first and second facing sheets includes a plurality of shapes cut within a remaining portion of the facing sheet. Each of the plurality of shapes of the first facing sheet defines a removable portion disposed over the remaining portion of the second facing sheet. Each of the plurality of shapes of the second facing sheet defines a removable portion disposed over the remaining portion of the first facing sheet.

The invention still further comprehends a sheet assembly including a first facing sheet having a first facing sheet surface. The first facing sheet includes a first plurality of shapes cut within a first facing sheet remaining portion. Each of the first plurality of shapes defines a first facing sheet removable portion. The sheet assembly further includes a second facing sheet having a second facing sheet surface disposed adjacent the first facing sheet surface. The second facing sheet includes a second plurality of shapes cut within a second facing sheet remaining portion. Each of the second plurality of shapes defines a second facing sheet removable portion.

A first adhesive material coating is on the first facing sheet surface and a second adhesive material coating is on the second facing sheet surface. The second adhesive material coating contacts the first adhesive material coating. Each of the first plurality of shapes is disposed over the second facing sheet remaining portion, such that upon removal of one of the first facing sheet removable portions the second adhesive material coating is exposed. Likewise, each of the second plurality of shapes is disposed over the first facing sheet remaining portion, such that upon removal of one of the second facing sheet removable portions the first adhesive material coating is exposed.

BRIEF DESCRIPTION OF THE DRAWINGS

These and other objects and features of this invention will be better understood from the following description taken in conjunction with the drawings.

DESCRIPTION OF THE DRAWINGS

Figure 1A:
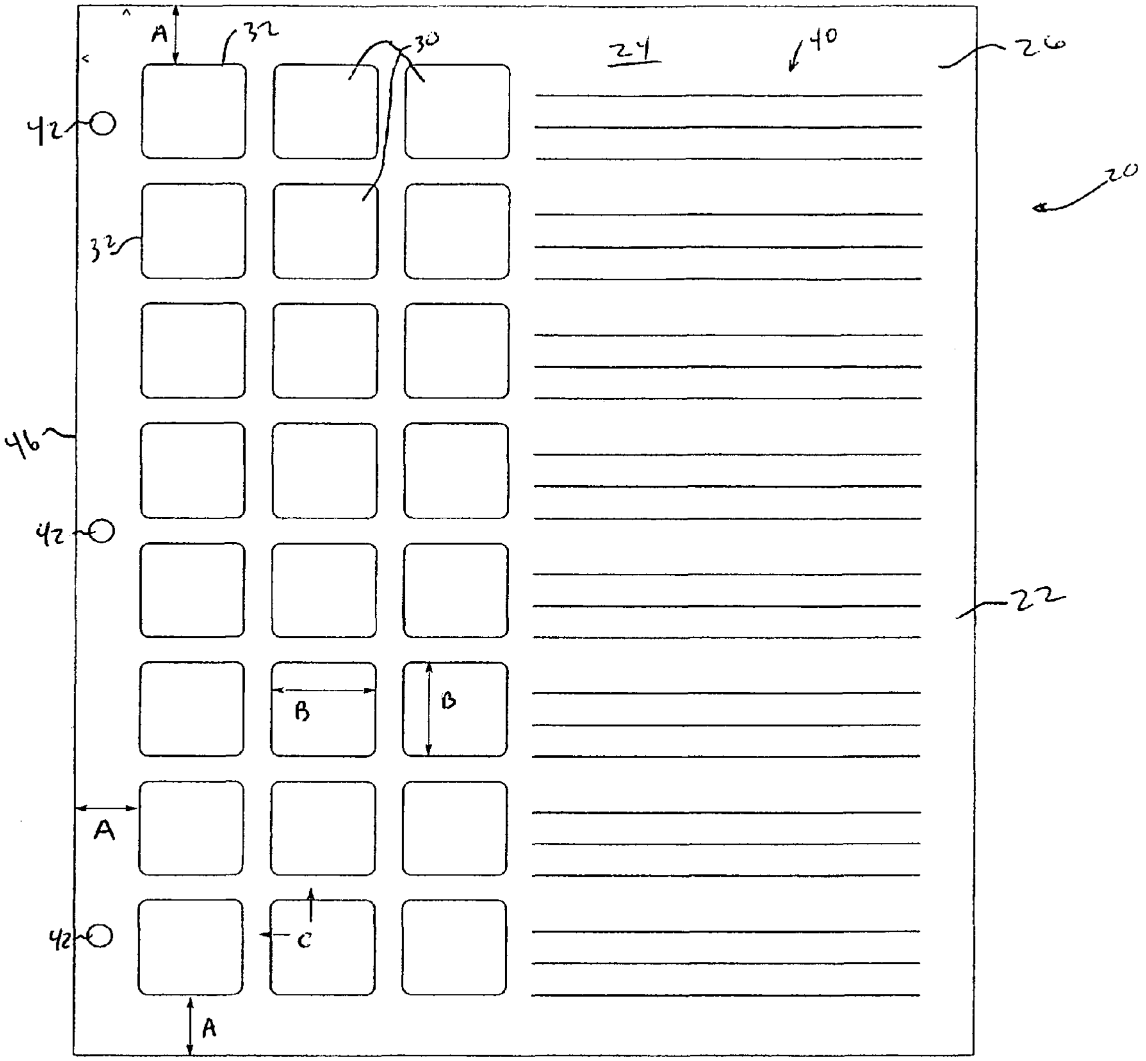
FIG. 1A is a plan view of a sheet according to one embodiment of this invention.
Figure 1B:
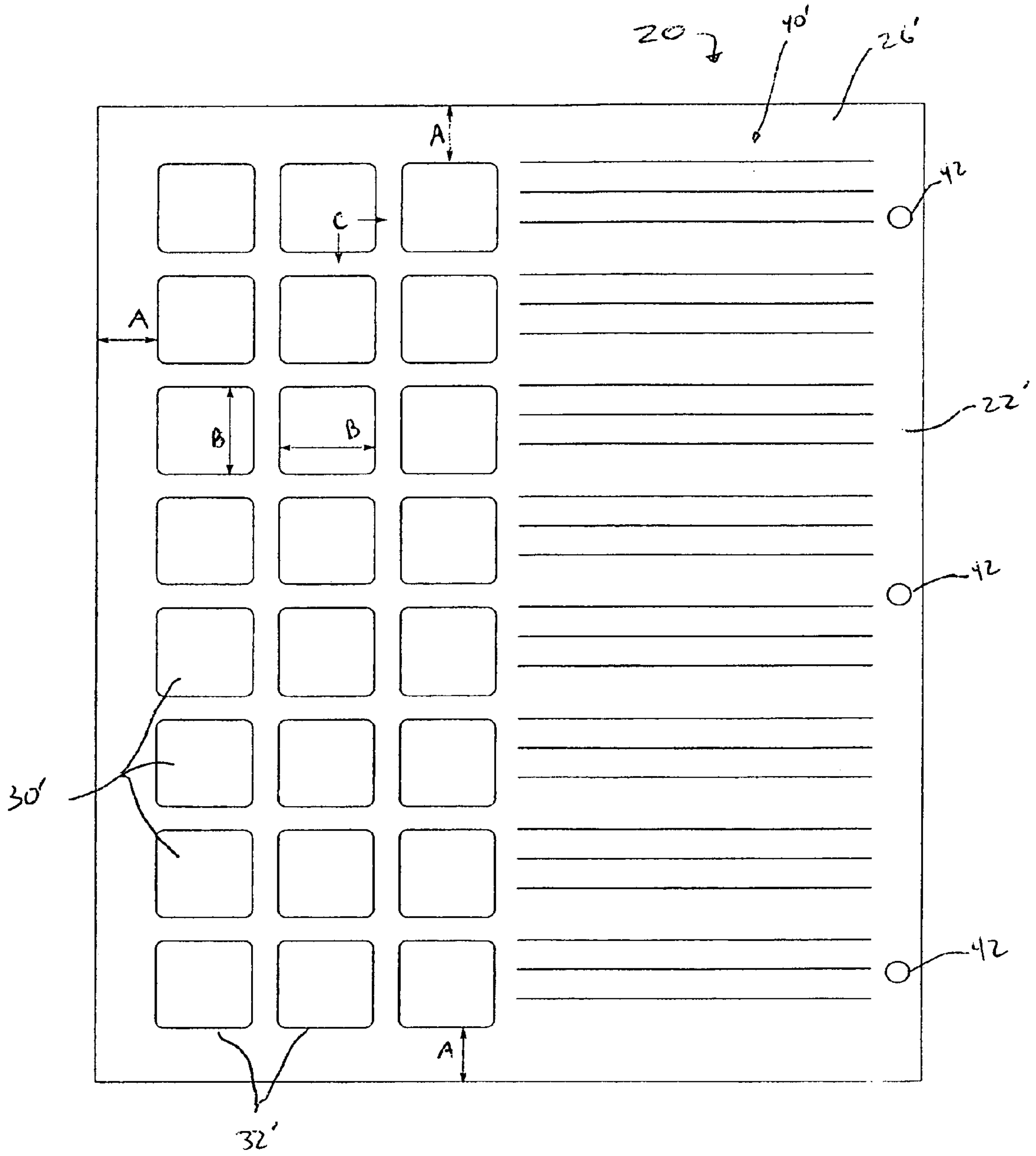
FIG. 1B is a plan view of the opposite side of the sheet shown in FIG. 1A.

FIGS. 1A and 1B illustrate a photo sheet 20 (not necessarily shown to scale) according to one embodiment of this invention. Photo sheet 20 is desirably formed of two opposing face sheets, such as face sheet 22 and face sheet 22'. The two face sheets are desirably the same size. The two face sheets are attached together by an adhesive coating. The adhesive coating can include any adhesive material known and available to those skilled in the art, such as adhesives for forming pressure sensitive, or self-adhesive labels. In one embodiment of this invention, each of the two face sheets 22 and 22' includes an adhesive material coating one side of the sheet. The two adhesive coated sheet surfaces are joined together to form the photo sheet 20. The face sheets 22 and 22' will be described below with particular reference to face sheet 22.

The photo sheet 20 is of any suitable shape. Common sizes of paper generally fed through printers are 8.5 inches by 5.5 inches, 8.5 inches by 11 inches, 8.263 inches by 11.688 inches (A4 size), and 8.5 inches by 14 inches. The face sheets are preferably, but not necessarily, constructed of any suitable paper, paper composite, non-metal and/or metal material that can be used as a label. Other suitable materials for constructing the face sheets include fabric, plastic, and metal foils. The adhesive coating is applied to the face sheets in any suitable manner known to those skilled in the art. The face sheet 22 desirably has a printable surface 24 on a side opposite the adhesive coating.

The face sheets and the printable surfaces of this invention can be any of a variety of face materials used to make pressure sensitive, or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

The face sheet 22 includes a plurality of shapes 30, each defining a removable portion. The phrase "shape", or the phrase removable or tearable shape or portion, is intended to relate to a shape, such as the shapes identified in FIG. 1A by element reference numerals 30, that can be torn away from a remaining portion 26 of the face sheet 22, by using tearable lines of separation 32. Tearable lines 32 can be die-cut lines, perforated lines, micro-perforated lines, or any combination of these types of separation, or any other suitable structure that enables separation. A preferred type of tearable line 32 is a line that is die-cut. The shapes 30 can be die-cut along at least a portion of a periphery, such that the shapes 30 can be easily removed or separated from the remaining portion 26 of the sheet 22.

The remaining portion 26 of the face sheet 22 includes a printable area 40. The printable area 40 includes an optional plurality of printed lines to facilitate handwriting or other printing or writing thereon. Optional punched holes 42 are included to allow the sheet 20 to be contained within, for example, a three-ring binder. As will be appreciated by those skilled in the art following the teachings herein provided, various and alternative sizes, shapes, and configurations are available for the holes, printed lines, and the printable area of this invention.

The second face sheet 22' attached to the face sheet 22 is configured similarly, but opposite of the face sheet 22. The second face 22' sheet also includes a plurality of shapes 30' defining removable portions, and a printable area 40' on the remaining portion 26'. When the two facing sheets 22 and 22' are aligned and attached, the printable area 40' of the second facing sheet 22' is aligned over or behind the plurality of shapes 30 of the facing sheet 22. Likewise, the printable area 40 of the facing sheet 22 is aligned over or behind the plurality of shapes 30' on the second facing sheet 22'. In other words, the remaining portion of each of the facing sheets acts as a backing or backing sheet for the removable shapes 30 of the other sheet. In one embodiment of this invention, two uncut sheets are first adhered together and the combined sheets are then die-cut to provide the removable shapes.

When the shapes 30 are removed from the facing sheet 22, the adhesive on the other facing sheet 22' remaining portion 26' is exposed. A photo, for example, can be attached to the photo paper 20 by the adhesive exposed by the removed shape 30. The printable area 40 can be used to add, for example, text describing or related to the attached photo. The removed shape 30 also includes an adhesive backing, which allows the shape 30 to be used as a label or sticker.

Thus the photo sheet of FIGS. 1A and 1B includes two opposing page surfaces with removable portions to expose adhesive to which photos can be adhered, as well as a printable portion to, for example, makes notes or describe the attached photograph.

As will be appreciated by those skilled in the art followings the teachings herein provided, various and alternative sizes, shapes and configurations are available for the photo sheet, the facing sheet, the removable shapes and the printable area of this invention. In the embodiment of this invention shown in FIGS. 1A and 1B, the removable shapes 30 and 30' are about one inch square (dimensions B), and separated by about 0.25 inches of remaining portion 26 and 26' (dimensions C). The removable shapes 30 and 30' are disposed, for example, about 0.625 inches (dimensions A) from the longitudinal edge 46. The number and placement of the removable portions can vary. For example, sizes according to known photo sizes can be utilized. Also, the removable portions are shown in the figures as being disposed on one side of the sheet, but could also be staggered on the sheet (desirably with an opposite staggering on the reverse side).

Figure 2:
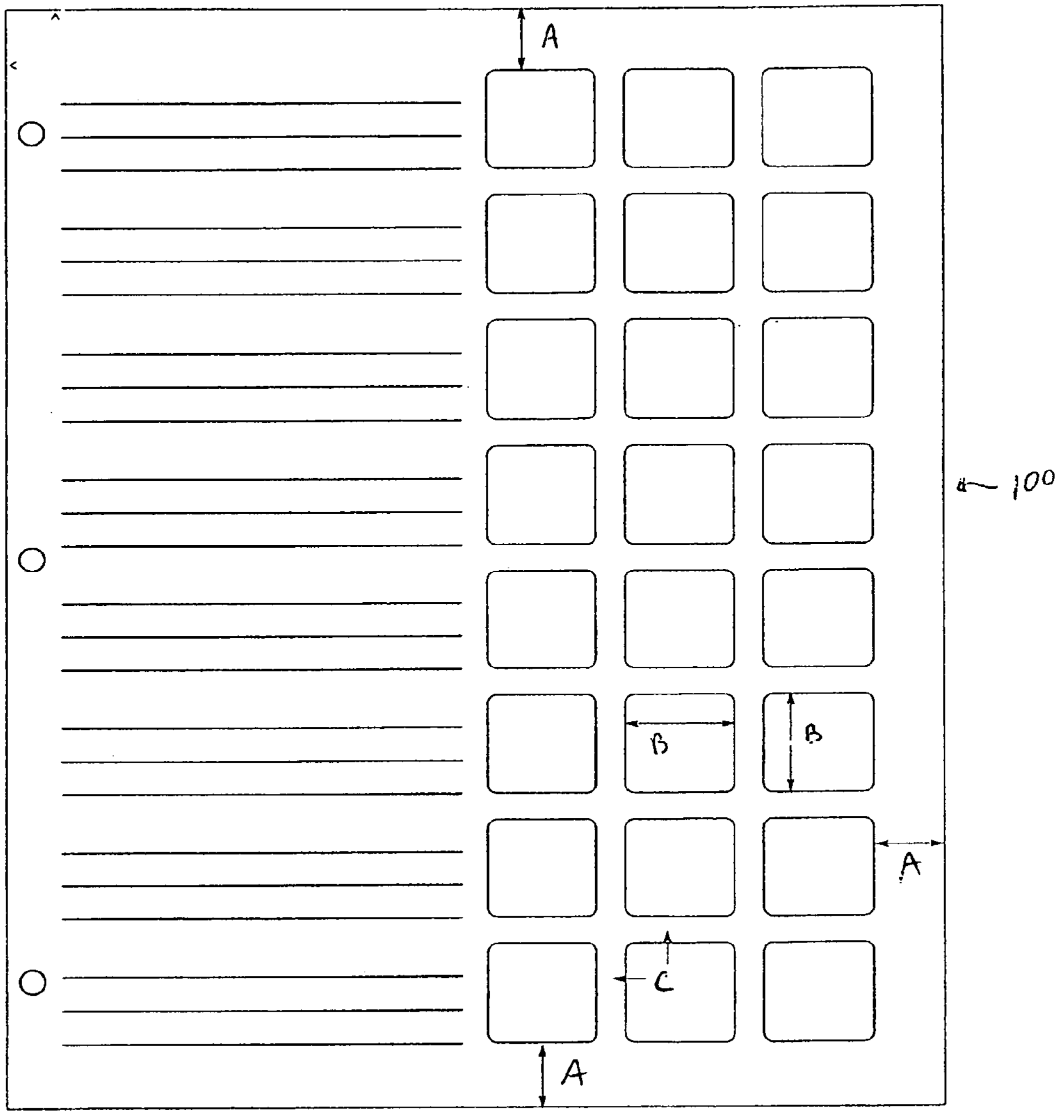
FIG. 2 is a plan view of a sheet according to another embodiment of this invention.

FIG. 2 illustrates a photo sheet 100 according to another embodiment of this invention. The photo sheet 100 is similar to the photo sheet 20 described above with reference to FIGS. 1A and 1B, but the photo sheet 100 has a generally opposite configuration from the photo sheet 20.

Figure 3:
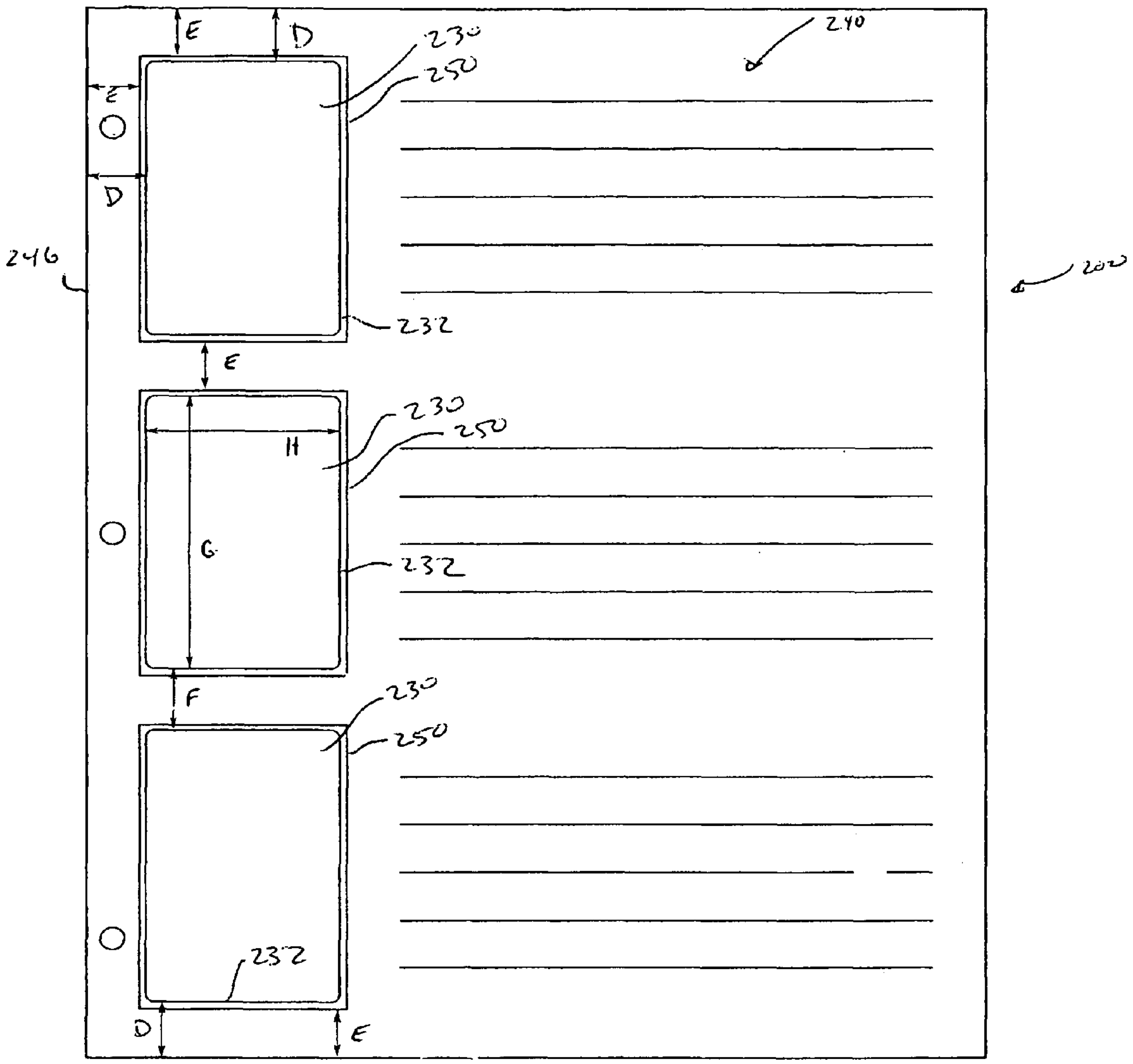
FIG. 3 is a plan view of a sheet according to yet another embodiment of this invention.

FIG. 3 illustrates a photo sheet 200 according to yet another embodiment of this invention. The photo sheet 200 includes similar elements as described above, yet includes a different number and size for the removable shapes 230. The photo sheet 200 includes three removable shapes 230, each desirably having a shape of about 2.875 inches (dimension G) by 1.875 inches (dimension H). The photo sheet 200 also includes a larger printable area 240. Also in the embodiment of FIG. 3, an optional printed border line 250 is included around the removable shapes 230. In the embodiment of this invention shown in FIG. 3, the removable shapes 230 are separated by about 0.625 inches (dimensions F) between the die cuts 232 and 0.5 inches (dimension E) between the optional printed border lines 250. The removable shapes 230 are disposed, for example, about 0.625 inches (dimension D) from the longitudinal edge 246. The optional printed border lines 250 are disposed, for example, about 0.5 inches (dimension E) from the longitudinal edge 46.

Figure 4:
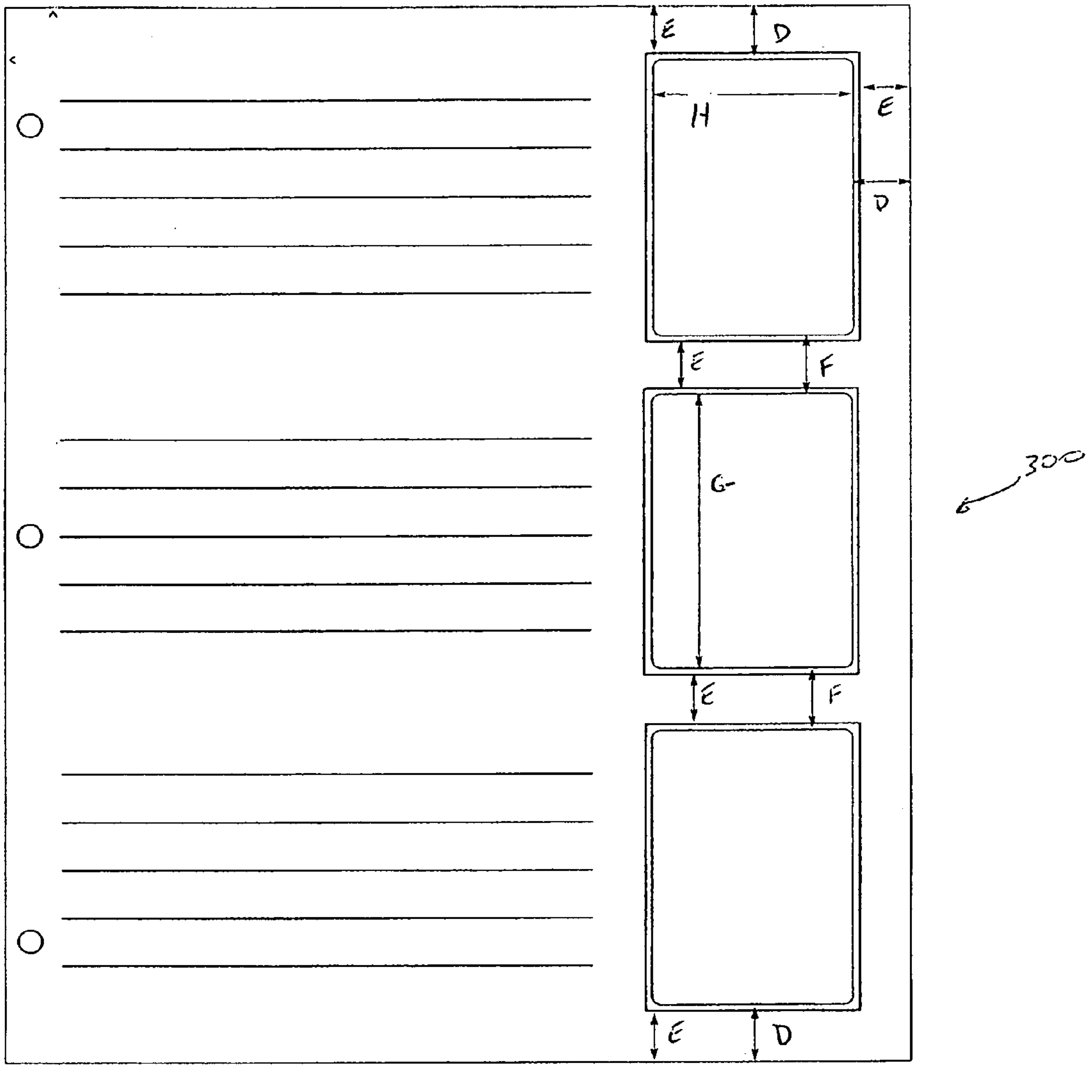
FIG. 4 is a plan view of a sheet according to still yet another embodiment of this invention.

FIG. 4 illustrates a photo sheet 300 according to another embodiment of this invention. The photo sheet 300 is similar to the photo sheet 200 described above with reference to FIG. 3, but the photo sheet 300 has a generally opposite configuration from the photo sheet 200.

Thus, the invention provides various and alternative configurations of photo sheets that include two page surfaces with cut shapes that are removable to expose adhesive to which photos can be adhered, as well as a printable portion to makes notes or describe the attached photograph.

It will be appreciated that details of the foregoing embodiment, given for purposes of illustration, is not to be construed as limiting the scope of this invention. Although only exemplary embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A sheet assembly, comprising:

a first facing sheet, a second facing sheet, and an adhesive material on the second facing sheet and disposed between the first and second facing sheets;

a plurality of shapes cut within the first facing sheet, each of the plurality of shapes defining a removable portion disposed over a portion of the second facing sheet, wherein upon removal of the removable portion from a remaining portion of the first facing sheet the adhesive material on the second facing sheet is exposed; and the remaining portion of the first facing sheet including a printable area.

2. The sheet assembly of claim 1, further comprising:

a second plurality of shapes cut within a second remaining portion of the second facing sheet, each of the second plurality of shapes defining a removable portion disposed over the remaining portion of the first facing sheet; and the second remaining portion including a second printable area.

3. The sheet assembly of claim 2, further comprising a first adhesive material coating on a side of the first facing sheet disposed toward the second facing sheet and a second adhesive material coating on a side of the second facing sheet disposed toward the first facing sheet.

4. The sheet assembly of claim 1, wherein each of the plurality of shapes includes a die-cut along at least a portion of a shape perimeter.

5. The sheet assembly of claim 1, wherein the printable area comprises a plurality of printed lines, wherein each of the printed lines is aligned with at least one of the plurality of shapes.

6. The sheet assembly of claim 1, further comprising more than one punched hole disposed along one edge of the sheet assembly.

7. A method of using the sheet assembly of claim 1, comprising:

removing the removable portion defined by one of the plurality of shapes to expose the adhesive material;

placing a picture on the exposed adhesive material.

8. The method according to claim 7, further comprising writing or printing on the printable area.

9. The method of claim 8, wherein the writing or printing on the printable area is aligned with the picture.

10. A sheet assembly, comprising:

a first facing sheet, a second facing sheet, and an adhesive material disposed between the first and second facing sheets;

each of the first and second facing sheets including a plurality of removable shapes cut within a remaining portion, each of the plurality of removable shapes of the first facing sheet defining a removable portion disposed over the remaining portion of the second facing sheet and removable to expose the adhesive material on the remaining portion of the second facing sheet;

each of the plurality of removable shapes of the second facing sheet defining a removable portion disposed over the remaining portion of the first facing sheet and removable to expose the adhesive material on the remaining portion of the first facing sheet.

11. The sheet assembly of claim 10, wherein each of the plurality of shapes includes a die-cut along at least a portion of a shape perimeter.

12. The sheet assembly of claim 10, further comprising a first adhesive material coating on a side of the first facing sheet disposed toward the second facing sheet and a second adhesive material coating on a side of the second facing sheet disposed toward the first facing sheet.

13. The sheet assembly of claim 12, wherein upon removal of the removable portion of each of the plurality of shapes of the first facing sheet the second adhesive material coating is exposed, and upon removal of the removable portion of each of the plurality of shapes of the second facing sheet the first adhesive material coating is exposed.

14. The sheet assembly of claim 10, wherein the remaining portion of each of the first and second facing sheets includes a printable area.

15. The sheet assembly of claim 14, wherein the printable area comprises a plurality of printed lines, wherein each of the printed lines is aligned with at least one of the plurality of shapes.

16. The sheet assembly of claim 10, further comprising more than one punched hole disposed along one edge of the sheet assembly.

17. A sheet assembly, comprising:

a first facing sheet having a first facing sheet surface, the first facing sheet including a first plurality of shapes cut within the first facing sheet, each of the first plurality of shapes defining a first facing sheet removable portion surrounded by a first facing sheet remaining portion;

a second facing sheet having a second facing sheet surface disposed adjacent the first facing sheet surface, the second facing sheet including a second plurality of shapes cut within the second facing sheet, each of the second plurality of shapes defining a second facing sheet removable portion surrounded by a second facing sheet remaining portion;

a first adhesive material coating on the first facing sheet surface;

a second adhesive material coating on the second facing sheet surface, the second adhesive material coating contacting the first adhesive material coating;

each of the first plurality of shapes disposed over the second facing sheet remaining portion, wherein upon removal of one of the first facing sheet removable portions the second adhesive material coating is exposed; and each of the second plurality of shapes disposed over the first facing sheet remaining portion, wherein upon removal of one of the second facing sheet removable portions the first adhesive material coating is exposed.

18. The sheet assembly of claim 17, wherein each of the first facing sheet removable portion and the second facing sheet removable portion includes a printable area.

19. The sheet assembly of claim 17, wherein each of the first and second plurality of shapes includes a die-cut along at least a portion of a shape perimeter.

20. The sheet assembly of claim 17, further comprising more than one punched hole disposed along one edge of the sheet assembly.

* * * * *